May 27, 1958     L. M. ODEN, SR., ET AL     2,836,058
SPARK PLUG BOMB AND LEAK TESTER
Filed Jan. 6, 1953     5 Sheets-Sheet 1

INVENTORS
LEWIS M. ODEN, SR.
FRANCIS T. ETHEREDGE
BY
*F. Schmitt*
*Walter S. Pawl.*
ATTORNEYS

INVENTORS
LEWIS M. ODEN, SR.
FRANCIS T. ETHEREDGE

May 27, 1958  L. M. ODEN, SR., ET AL  2,836,058
SPARK PLUG BOMB AND LEAK TESTER
Filed Jan. 6, 1953  5 Sheets-Sheet 3

INVENTORS
LEWIS M. ODEN, SR.
FRANCIS T. ETHEREDGE
BY
*T.J. Schmitt*
*Walter S. Paul*
ATTORNEYS INVENTORS
LEWIS M. ODEN, SR.
FRANCIS T. ETHEREDGE
BY
*Schmitt*
*Walter S. Pawl*
ATTORNEYS

United States Patent Office 2,836,058
Patented May 27, 1958

2,836,058

SPARK PLUG BOMB AND LEAK TESTER

Lewis M. Oden, Sr., and Francis T. Etheredge, Norfolk, Va.

Application January 6, 1953, Serial No. 329,936

3 Claims. (Cl. 73—40)

(Granted under Title 35, U. S. Code (1952), sec. 266)

The present invention relates to a spark plug testing machine which tests gas leakage through the core of the plug and simultaneously subjects the plug to an ignition test.

Testing machines commonly in use utilize several steps to accomplish what the present invention does in one simple and nearly automatic operation. Leakage through the plug core is readily detected by the machine of the present invention, and additionally, the rate per minute or second of such leakage may be readily computed by the operator for the reason that an interval timing device has been incorporated in the machine and is started and stopped by the operation of the machine.

The primary object of the invention is to provide a compact, speedy, and simple machine for testing the sparking characteristics of spark plugs and at the same time subjecting the plug to a pressure test through the core, with a visible leak detector at convenient eye-level to the operator.

Another object of the invention is to provide a testing machine having an automatic cut-off of the sparking current for the protection of the operator.

A still further object of the invention is to provide a machine having readily replaceable holders to fit various lengths and sizes of spark plugs.

A still further object is to provide a machine in which the operation of the several steps are preformed simultaneously and with a minimum of movements of the operator's hands.

Other objects and advantages of the invention will hereinafter become more fully apparent from the following description of the annexed drawings, which illustrate a preferred embodiment of the invention, and wherein.

Figure 1:
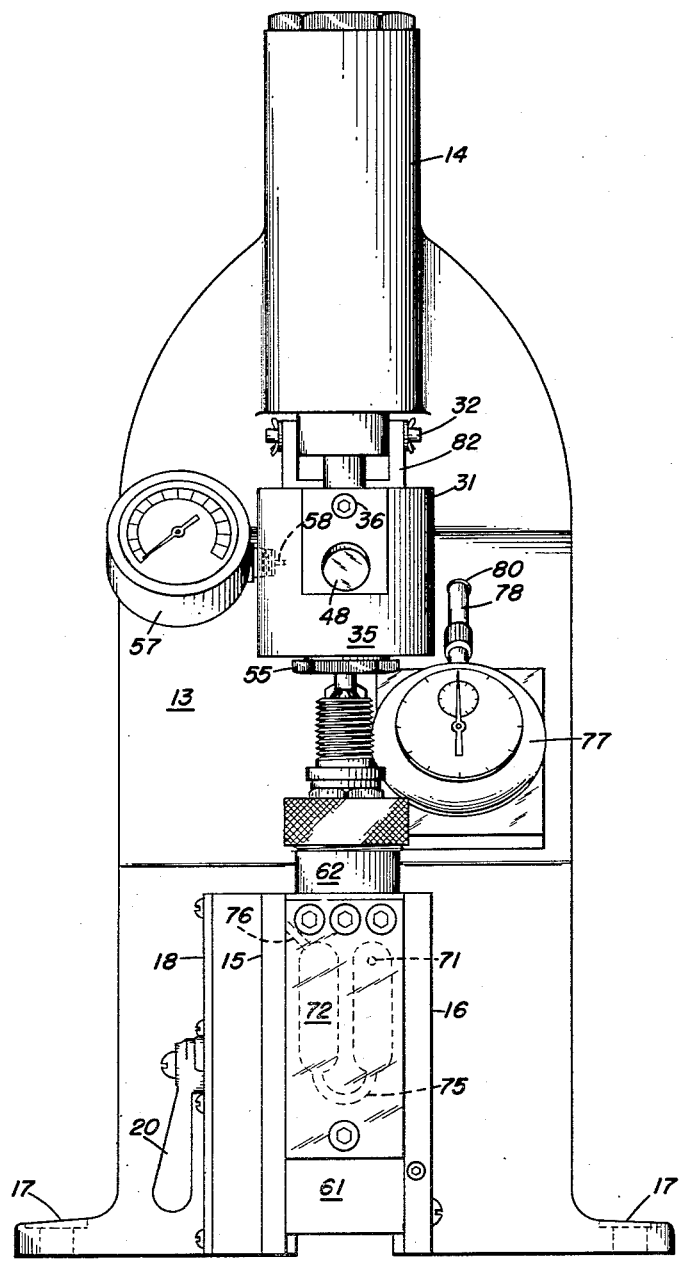
Fig. 1 is a front elevational view of the invention.
Figure 2:
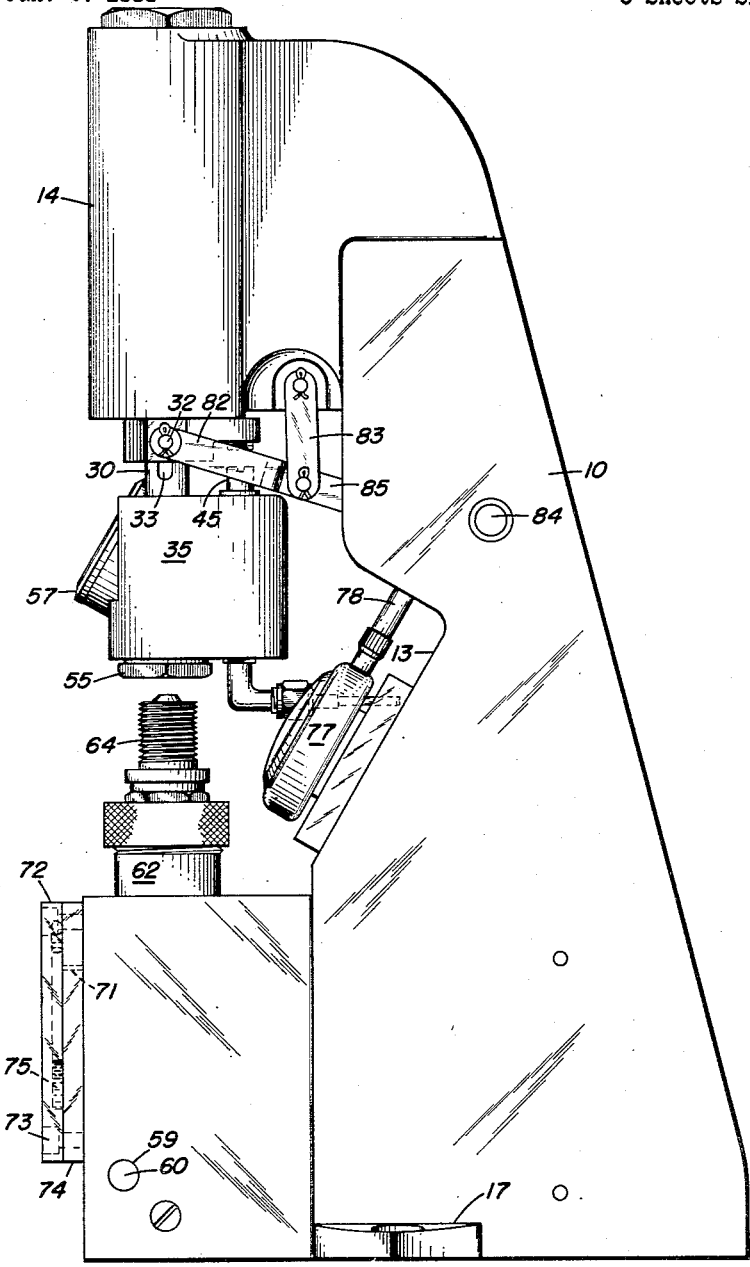
Fig. 2 is a side elevational view of the invention.
Figure 3:
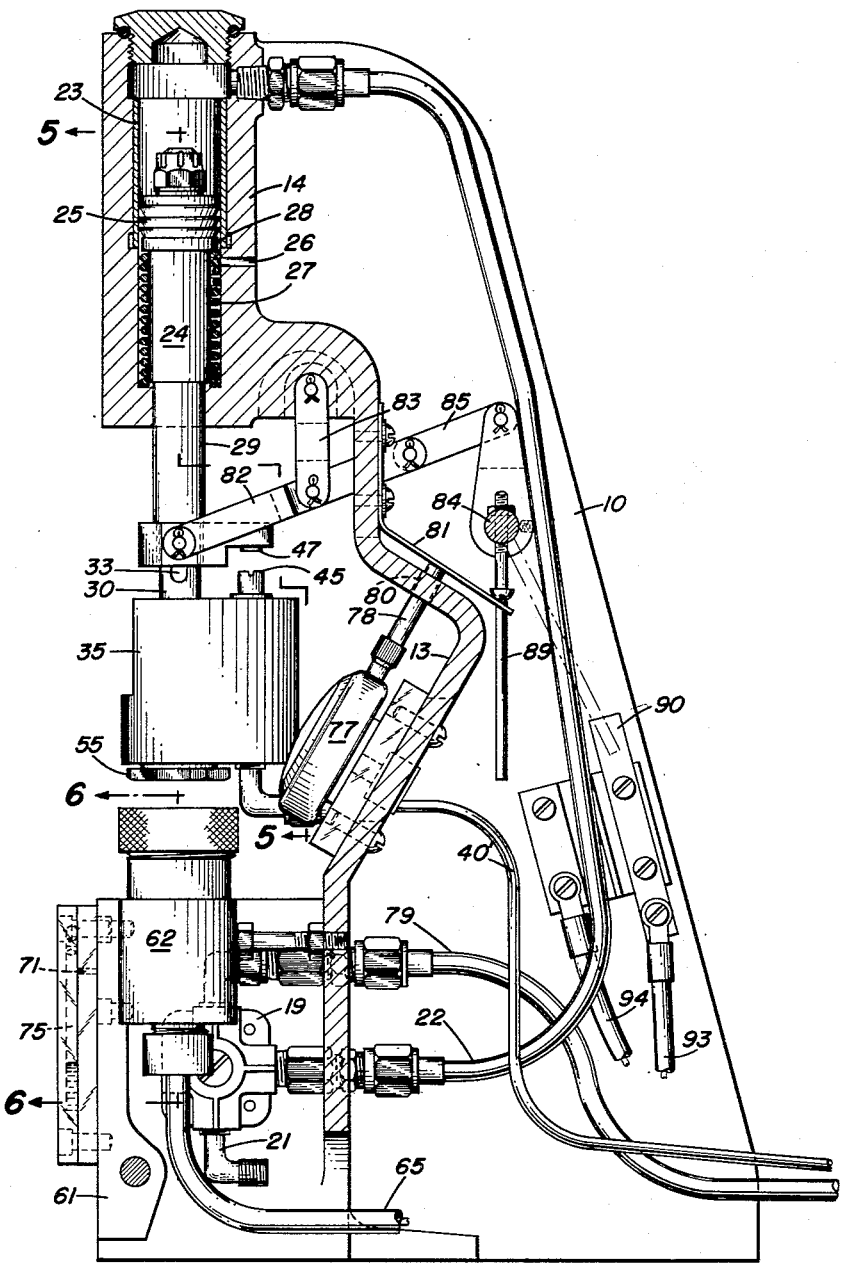
Fig. 3 is a side view partly in section.
Figure 4:
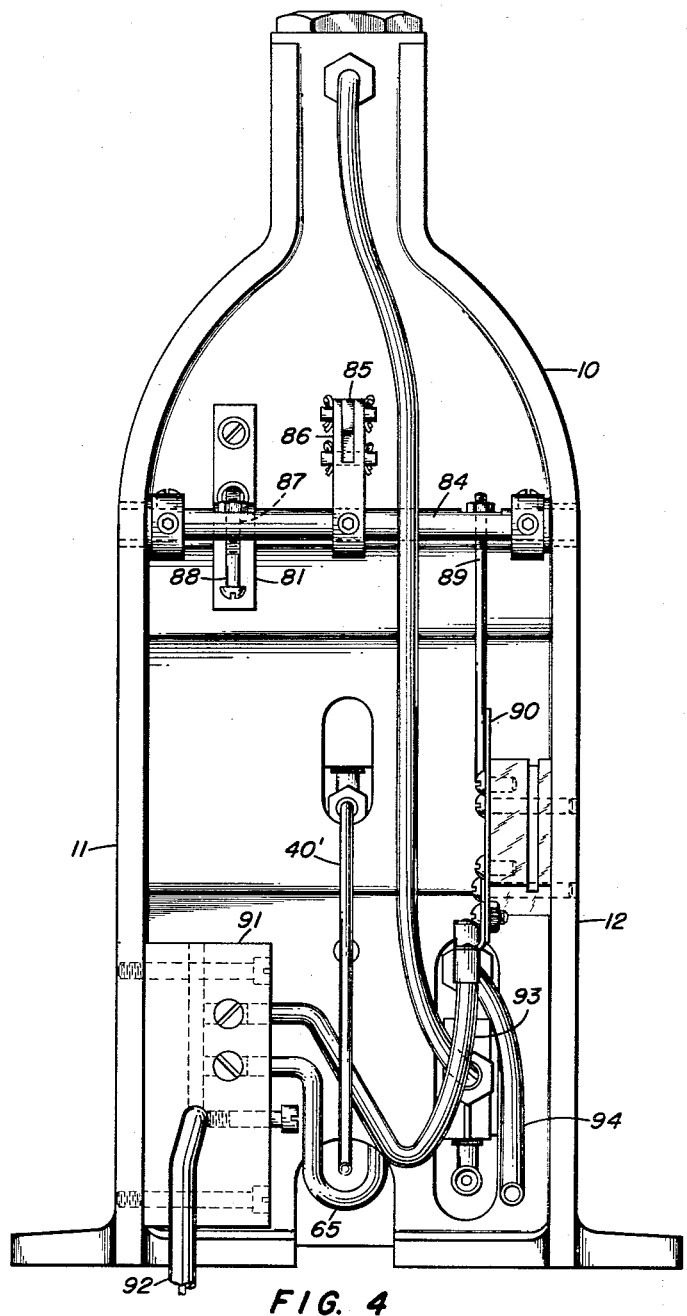
Fig. 4 is a rear elevational view.

Referring now to the drawings, in which like numerals indicate like parts throughout the several views, Figs. 1 to 4 show an arbor 10 to be the support for the various parts of the machine and having side flanges 11, 12, a front face 13, a plunger head or air cylinder 14, plug holder flanges or frames 15, 16 and bores 17 by which the machine may be bolted to a table or bench.

The frame 15 of the plug holder has a plate 18 upon which is mounted valve 19 with its operating handle 20 convenient to the operator. In the side view, Fig. 3, it is seen that valve 19 is connected to tubing 79 leading to a source of gas under pressure, preferably $CO_2$, or other inert gas. Elbow 21 on valve 19 exhausts to atmosphere compressed air admitted to the conduit 22 and cylinder 23, on return of the valve handle 20 to closed position. Cylinder 23 has piston 24 with seals 25 and port 26, and compression spring 27 bearing on washer 28 returns piston 24 upwardly on release of the air through valve 19 and elbow 21.

Figure 5:
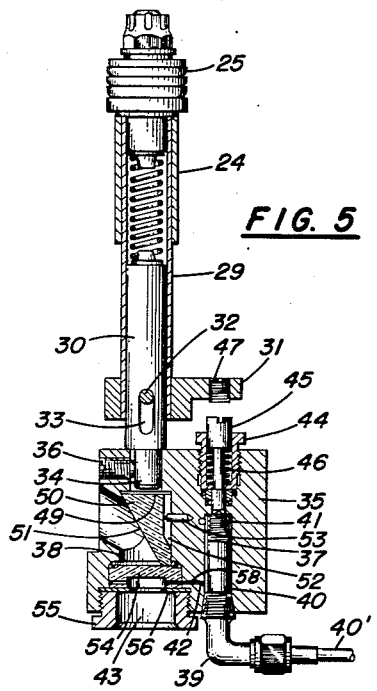
Fig. 5 is a detailed view in section taken on line 5—5 of Fig. 3.

In Fig. 5 it will be seen that piston 24 has an inner sleeve 29 and has a pin 32 movable in slot 33 to form a lost-motion connection. Reduced end 34 of rod 30 has bomb block 35 secured to it with set screw 36. Bomb block 35 has two bores 37, 38, through it, bore 37 being connected at the lower end by elbow 39. The upper end of elbow 39 has soldered to it valve nipple 40, in which is screwed a conventional short style tire valve 41. Flexible tubing 40' is connected to a supply of gas under pressure. Nipple 40 is of slightly less diameter than the bore 37, permitting gas flow around the nipple through port 42 to chamber or recess 43. The upper end of bore 37 is threaded to receive plug 44 having a plunger 45 biased upwardly by spring 46. A set screw 47 in valve operating block 31 permits adjustment of the operation of the tire valve 41 after the bomb block 35 has descended to meet with the gap end of a spark plug held in the machine as hereinafter described.

Bomb block 35 has a third bore 48 forming a slight hole opening into bore 38. Metallic plate 49 forms a base for an optical piece 50, which in this embodiment is a cylinder of plastic having a polished face 51 and a slot 52 fitting over pin 53 for alignment purposes. A lens 54 is secured in the bore 38 by cap nut 55 and compression seal 56. Pressure gauge 57 is mounted on block 35 and connected to bore 37 by passage 58.

Figure 6:
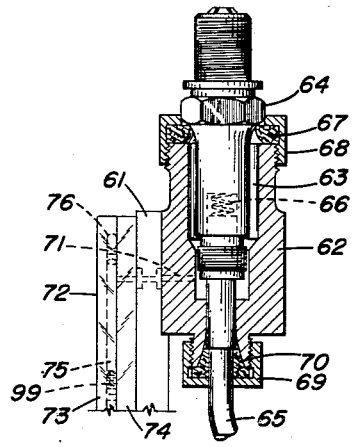
Fig. 6 is a detailed view in section taken on line 6—6 of Fig. 3.
Figure 7:
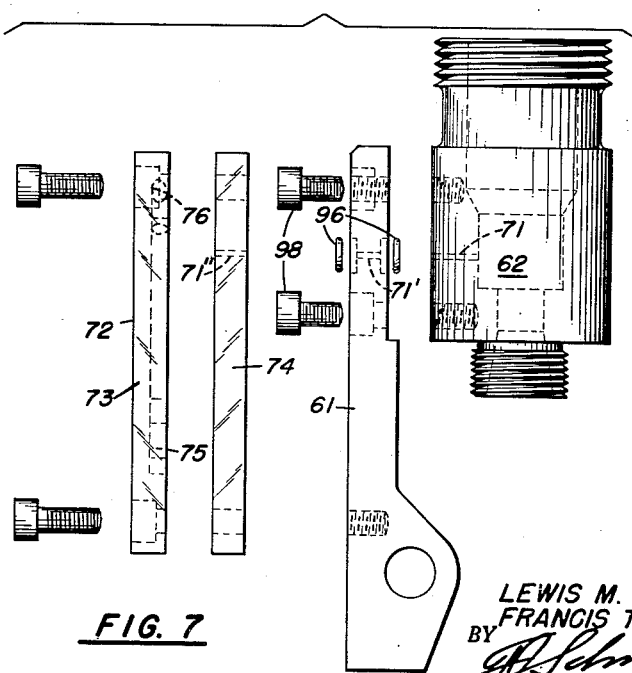
Fig. 7 is an exploded view of the plug holder and the visual leak detector portion of the invention.

The flanges 15 and 16 of arbor 10 have a hole 59 in which fits pin 60 allowing plug holder plate 61 to pivot thereon. As shown in Figs. 6 and 7, plug holder 62 is removably secured to the plate 61 by bolts 98 and has a chamber 63 in which is inserted a spark plug 64 to be tested, the electrode end of the spark plug being adapted for contact with spring 66 connected to high tension lead 65. A seal 67 at the upper end of the holder is held snugly against the shoulder of the spark plug by the hexagonal cap nut 68, which is made in various sizes to accommodate differently sized spark plugs. A similar nut 69 and seal 70 prevent escape of gas around the high tension lead 65. Chamber 63 is connected by passages 71, 71', 71'' through the plug holder 62, plate 61, and through one transparent block 74. The other transparent block 73 has routed out on its inner face a U-shaped passage 75 with upwardly-extending arms, one connected with passage 71'' and the other vented to atmosphere at 76. O-rings 96 and cementing of the transparent plates 73 and 74 together make the assembly of the leak detector leak proof and of easily demounted parts. A liquid 99 inserted in the passage 75, and preferably colored, will show by bubbling in one arm of the tube any gas escaping through the core of the spark plug when the bomb block 35 has been lowered to enclose the gap end of the spark plug and the gas has been admitted to the chamber formed between the gap end and the lens 54.

Returning to Figs. 1 to 4, a stop watch 77, of the type that is set into operation by depressing the stem, is secured to the front face 13 and is actuated by plunger 78 projecting through hole 80 and secured to the leaf spring 81. A yoke arm 82 is pivoted on the ends of pin 32 and is fulcrumed by link 83 to rotate shaft 84 by intermediate linkage 85 and crank 86. Shaft 84 is traversed by a threaded hole 87 in which is adjustably secured bolt 88, the head of which bears on leaf spring 81 to start and stop the watch. Shaft 84 is also bored and threaded to receive the shorting arm 89 which swings to contact switch arm 90. A connector block 91 provides for a quick connection to current supply cable 92 leading to a magneto (not shown) or other source of sparking current. The lead 65 at the terminal end of the spark plug also is connected in the connector block 91, and cable 93 connects the connector block to one end of the switch arm 90 to ground the sparking current when the yoke arm 82 is raised, rotating shaft 84 and swinging the shorting arm 89 to the position shown in dotted lines in Fig. 3. A grounding cable 94 connects the arbor 10 to the current supply and completes the electrical circuit.

The operation of the machine is believed obvious from the foregoing description, the operator placing a spark plug in the holder, giving the valve handle a quarter turn to admit air to the cylinder 23 which presses the bomb block 35 down on the up-ended spark plug. Gas is admitted to the chamber in the bomb block by the automatic operation of the valve 41 and the stopwatch is set into action, while the shorting arm 89 swings away from the contact switch arm 90, permitting current to jump the gap of the spark plug. The spark gap action is easily inspected through the window port in the bomb block as reflected on the polished face of the optical piece. The number of bubbles in the U-shaped passage 75, per second or minute, is readily observed by the operator at the same time the sparking characteristics of the plug are determined. A glance at the pressure gauge 57 verifies the application of the desired pressure of the gas used, the short length of passage and small size of the recess or chamber in the bomb block permitting the reaching of any desired pressure nearly instantaneously, and with a consequent saving of the gas. A flip of the valve handle 20, and the bomb block 35 rises, freeing the plug in the holder from its downward pressure on seal 67, and permits rapid repeated inspection of spark plugs in quantity.

Various modifications are contemplated and may obviously be resorted to by those skilled in the art without departing from the spirit and scope of the invention, as hereinafter defined by the appended claims.

The invention described herein may be manufactured and used by or for the Government of the United States of America for governmental purposes without the payment of any royalties thereon or therefor.

What is claimed is:

1. In combination with a spark plug testing machine having an arbor and a bomb block movable thereon to encompass the gap end of a spark plug held on said arbor, said bomb block having a conduit connection to a source of gas under pressure, means for making visible any gas leaking through the core of the spark plug from its gap and positioned in said bomb block comprising: a plate on said arbor, a substantially cylindrical spark plug holder secured to said plate, sealing means at each end of said holder adapted to coact with the end surfaces of a spark plug held therein to form a gas-tight chamber around the shell of the spark plug, a first transparent plate piece secured to said plate in face to face relationship, a second similar transparent piece cemented to said first piece, said second piece having formed on the cemented face thereof an upwardly extending U-shaped chamber, one arm of which is open to the atmosphere and the other arm of which is connected by a passage through said first piece, said plate, and said holder to said first chamber, and a bubble-revealing liquid in said U-shaped chamber between said arms.

2. The device as set forth in claim 1 and an air operated piston on said arbor movably supporting said bomb block.

3. The device as set forth in claim 2 together with a valve in the conduit connection to said source of gas under pressure, and means connected to said piston adapted to actuate said valve.

References Cited in the file of this patent

UNITED STATES PATENTS

| | | |
|---|---|---|
| 1,571,958 | Mueller | Feb. 9, 1926 |
| 1,589,825 | Staebler | June 22, 1926 |
| 2,369,920 | Saunders | Feb. 20, 1945 |
| 2,685,060 | Pierce | July 27, 1954 |